US006965785B2

(12) United States Patent
Mager et al.

(10) Patent No.: US 6,965,785 B2
(45) Date of Patent: Nov. 15, 2005

(54) COOPERATIVE WIRELESS LUMINESCENT IMAGERY

(75) Inventors: Gary N. Mager, Seattle, WA (US); Paul R. Nash, Bellevue, WA (US); G. Eric Engstrom, Kirkland, WA (US)

(73) Assignee: Wildseed Ltd., Kirkland, WA (US)

( * ) Notice: Subject to any disclaimer, the term of this patent is extended or adjusted under 35 U.S.C. 154(b) by 637 days.

(21) Appl. No.: 09/975,524

(22) Filed: Oct. 10, 2001

(65) Prior Publication Data

US 2003/0017823 A1 Jan. 23, 2003

Related U.S. Application Data

(63) Continuation-in-part of application No. 09/908,118, filed on Jul. 17, 2001.

(60) Provisional application No. 60/306,326, filed on Jul. 17, 2001.

(51) Int. Cl.⁷ .......................... H04H 7/00; H04M 3/00; H04M 3/42; H04M 1/00; H04Q 1/30; H04Q 5/00

(52) U.S. Cl. .................. 455/566; 455/3.06; 455/414.1; 455/418; 455/502; 455/550.1; 455/556.1; 340/7.55; 345/1.1

(58) Field of Search .......................... 455/412.1, 414.1, 455/414.3, 418–420, 3.06, 456.1, 456.3, 455/456.6, 457, 500, 502, 503, 507, 514, 455/550.1, 566, 41.2, 59–60, 66.1, 422.1, 455/429–430, 506–513, 553.1, 556.1, 556.2, 455/557, 560; 345/1.1–1.3, 2.1–2.3, 39, 45–46, 345/55–56, 213–214, 694, 970.1, 31, 3.1, 345/63, 589; 348/14.02, 14.03, 14.12, 14.15, 348/14.16, 46–48, 52, 370, 521–524, 561; 340/7.55, 7.56, 323 R, 815.5

(56) References Cited

U.S. PATENT DOCUMENTS

| | | | | |
|---|---|---|---|---|
| 4,814,756 A | * | 3/1989 | Chauvel | 345/565 |
| 5,273,437 A | | 12/1993 | Caldwell et al. | |
| 5,444,456 A | | 8/1995 | Ohta et al. | |
| 5,701,258 A | * | 12/1997 | Harris et al. | 340/7.53 |
| 5,710,598 A | * | 1/1998 | Ukai et al. | 375/240.2 |
| 5,726,701 A | | 3/1998 | Needham | |
| 5,738,583 A | | 4/1998 | Comas et al. | |
| 5,748,157 A | | 5/1998 | Eason | |
| 5,832,065 A | * | 11/1998 | Bannister et al. | 379/93.08 |
| 5,993,314 A | | 11/1999 | Dannenberg et al. | |

(Continued)

FOREIGN PATENT DOCUMENTS

EP     1 109 147 A1 *  6/2001  ............ G09G 3/32

OTHER PUBLICATIONS

EP 0 872 996 A (Nokia Mobile Phones Ltd), Oct. 21, 1998, col 1, lines 3-7, col 4, line 4, col. 5, line 12, col 7, line 16 col 8, line 1, abstract; figure 2.

(Continued)

Primary Examiner—William Trost
Assistant Examiner—Meless Zewdu
(74) Attorney, Agent, or Firm—Schwabe, Williamson & Wyatt, P.C.

(57) ABSTRACT

A wireless communication device having luminescent display capabilities in accordance with various embodiments is provided with a machine accessible medium including instructions to receive data representing a set of one or more picture elements of an audience assisted image to facilitate coordinated display of a luminescent representation of a portion of the audience assisted image by the wireless communication device in cooperation with one or more additional wireless communication devices, as well as a processor to execute the instructions.

42 Claims, 11 Drawing Sheets

U.S. PATENT DOCUMENTS

| | | | |
|---|---|---|---|
| 6,071,002 A * | 6/2000 | Katayama | 434/257 |
| 6,265,984 B1 | 7/2001 | Molinaroli | |
| 6,297,787 B1 * | 10/2001 | Nishida | 345/1.3 |
| 6,404,409 B1 | 6/2002 | Solomon | |
| 6,483,515 B1 * | 11/2002 | Hanko | 345/545 |
| 2002/0050685 A1 * | 5/2002 | Kono | 277/355 |
| 2002/0051527 A1 * | 5/2002 | Monroe | 379/188 |
| 2002/0055986 A1 * | 5/2002 | King et al. | 709/219 |
| 2002/0063799 A1 * | 5/2002 | Ortiz et al. | 348/559 |
| 2003/0011701 A1 * | 1/2003 | Nilson et al. | 348/370 |
| 2003/0052964 A1 * | 3/2003 | Priestman et al. | 348/14.02 |

OTHER PUBLICATIONS

EP 0 546 844 A (Avix, Inc.), Jun. 16, 1993, p. 2, line 30, p. 4, line 21, abstract, figures 1,2.

DE 33 47 076 A (Ackermann Albert GMBH Co.), Jul. 4, 1985, p. 6, paragraph 1, p. 14, line 9, p. 19, line 17, abstract, figure 1.

* cited by examiner

| EVENT CODE 402 | LOCATOR REFERENCE 404 | CLIENT IDENTIFIER 406 | PATTERN(S) TO BE DISPLAYED 408 |
|---|---|---|---|
| 126 | 212A3 | 4185552468 | 1 |
| | 212A4 | 212A41 | ALL |
| | ... | ... | ... |
| | ... | ... | ... |
| | 355Z26 | 212A41 | 0 |
| 128 | ... | ... | ... |
| | ... | ... | ... |

FIG. 4A

| EVENT CODE 402 | PATTERN 408 | CONTROL VECTOR 410 |
|---|---|---|
| 126 | 1 | 1010110101 |
| | 2 | 1010111111 |
| 128 | 1 | 1110001110 |
| | 2 | 0011100010 |

FIG. 4B

| EVENT CODE 402 | LOCATOR REFERENCE 404 | PATTERN 408 | CONTROL VECTOR 410 |
|---|---|---|---|
| 126 | 212A3 | 1 | 101010101 |
| | | 2 | 111100001 |
| | 212A4 | 1 | 001100110 |
| | | 2 | 101111101 |
| 128 | 212A3 | 1 | 101000000 |
| | ... | 2 | 111100001 |

FIG. 4C

COOPERATIVE WIRELESS LUMINESCENT IMAGERY

RELATED APPLICATIONS

The present application is a continuation-in-part application of copending U.S. patent application Ser. No. 09/908,118, filed Jul. 17, 2001, entitled "LUMINESCENT SIGNALING DISPLAYS UTILIZING A WIRELESS MOBILE COMMUNICATION DEVICE", and claims priority to U.S. Provisional Patent Application No. 60/306,326, filed Jul. 17, 2001, entitled "Personalizing Electronic Devices and Smart Covering". The specifications of these applications are herein fully incorporated by reference.

BACKGROUND OF THE INVENTION

1. Field of the Invention

The present invention relates to the field of wireless mobile communications. More specifically, the present invention relates to cooperative display of luminescent patterns to further improve the communication and entertainment aspects of wireless mobile communication devices.

2. Background Information

Advances in integrated circuit and telecommunication technology have led to wide spread adoption of wireless mobile client devices, in particular, wireless mobile phones. Wireless mobile phones are popular, partly because they offer the advantage of enabling their users to be communicatively reachable by their business associates, friends and family members, wherever the users may be, as long as they are within the reach of the service networks. Aside from convenience, wireless mobile phones are also popular due to their relatively affordable price as the cost for owning and using a wireless mobile phone today is well within the ability of many non-professionals. In fact, ever since their initial introductions, the cost for owning and using wireless mobile phones has steadily declined. As the cost of ownership has continued to decrease, successive generations of wireless mobile phones, as well as wireless client devices in general, have also included more functions and increased performance in a smaller package.

In fact, given the widespread availability of wireless mobile clients, both manufacturers and service providers alike are continually being pressured to improve the features available and services offered to users through their wireless mobile clients. In particular, as the number of wireless mobile clients including mobile phones used by non-professionals continues to increase, the demand for entertainment based mobile applications and even games also continues to increase. Even though manufacturers and service providers continue to improve such offerings, a greater number of features and improved functionality nonetheless remains desirable.

BRIEF DESCRIPTION OF DRAWINGS

The present invention is illustrated by way of example and not by way of limitation in the figures of the accompanying drawings, in which like references indicate similar elements and in which:

FIGS. 4A–4C illustrate various example data organizations suitable for use to store various visualization configuration related information for practicing the present invention, in accordance with one embodiment;

DETAILED DESCRIPTION

The present invention provides for cooperative and synchronized display of one or more luminescent images by a community of wireless mobile devices such as wireless mobile phones. In the description to follow, for purposes of explanation, various details are set forth in order to facilitate a thorough understanding of the present invention. However, the present invention may be practiced without some or many of the specific details. In other instances, in order not to obscure the present invention, well-known features are omitted, simplified or merely briefly described.

The description will be presented using terms that are commonly employed by those skilled in the art of wireless mobile communications to convey the substance of their work to others skilled in the same art. Examples of these terms include but are not limited to transmitting, receiving, determining, requesting, and so forth. As those skilled in the art of wireless mobile communications would appreciate, these quantities may take the form of electrical, magnetic, or optical signals, and the operations involve corresponding processing of these signals by electrical, magnetic, or optical components.

The terms "wireless communication device" and "wireless mobile client" are interchangeably used herein to refer to a class of electronic communications devices that enable a user to receive, and in some cases transmit, electronic communications signals including both analog and digital communications signals. Such wireless communication devices include, but are not limited to wireless mobile telephones and land-line telephones, pagers, walkie-talkies, personal digital assistants, and so forth.

The term "wireless mobile phone" as used herein refers to the class of telephone devices equipped to enable a user to make and receive calls wirelessly, notwithstanding the user's movement, as long as the user is within the communication reach of a "service or base station". Unless specifically excluded, the term "wireless mobile phone" is to include the analog subclass as well as the digital subclass (of all signaling protocols).

Various operations will be described as multiple discrete steps in turn, in a manner that is most helpful in understanding the present invention. However, the order of description should not be construed as to imply that these operations are necessarily order dependent. In particular, these operations need not be performed in the order of presentation. Furthermore, the phrase "in one embodiment" will be repeatedly employed in the description to follow. In general, the phrase does not refer to the same embodiment, although in some instances it may.

Figure 1A:
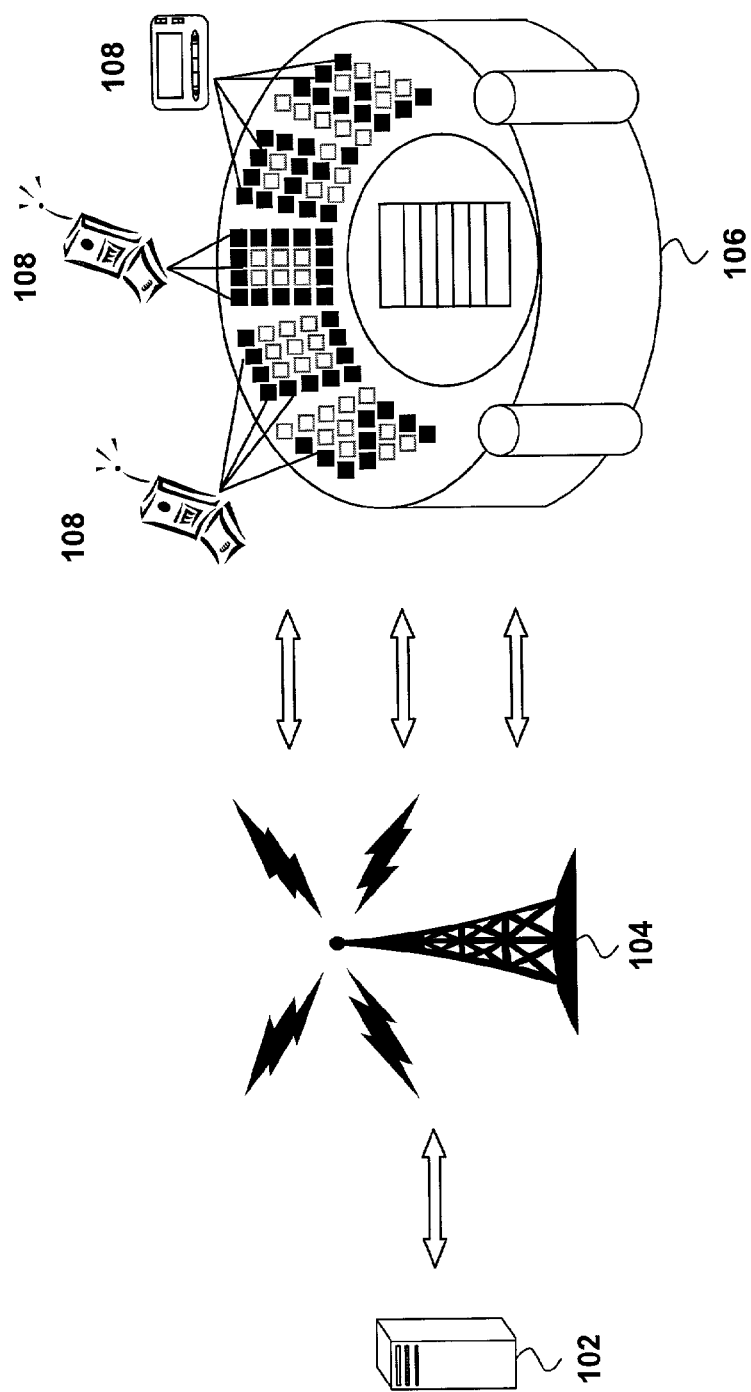
FIGS. 1(A–D) illustrate an overview of the present invention, in accordance with various embodiments.

Reference is now made to FIG. 1A, where an overview of the present invention is illustrated. As shown, communication server 102 is communicatively coupled to wireless mobile clients 108 via wireless transmission network 104. Wireless transmission network 104 is intended to represent a broad category of wireless and wireline transmission networks to provide wireless communication capabilities, and optionally telephony capabilities, to wireless mobile clients 108. Wireless transmission network 104 may consist of one or more communication networks employing one or more signaling protocols, including, but not limited to, code division multiple access (CDMA), time division multiple access (TDMA), global system for mobile communications (GSM), cellular digital packet data (CDPD), and so forth. Each such communication network may further be comprised of one or more transmitters, receivers, relays, base stations, and so forth, depending e.g. upon the implementation and physical separation between communication server 102 and wireless transmission network 104.

Wireless mobile clients 108 are collocated with one another at venue 106 and represent various ones of a class of wireless mobile client devices including, but not limited to wireless mobile phones, palm-top computers such as a personal digital assistant (PDA), two-way pagers, and so forth. Venue 106 is illustrated to represent a stadium equipped to hold tens, hundreds, thousands, or even hundreds of thousands of people or "users" furnished with wireless mobile client devices. In one embodiment of the present invention, participating ones of wireless mobile clients 108, with support from communication server 102, display luminescent patterns that cooperatively combine to form an audience assisted luminescent image (hereinafter referred to as a "crowd pattern"). In another embodiment, select ones of wireless mobile clients 108 cooperatively display sequences of synchronized crowd patterns to convey a sense of motion or luminescent animation. For example, a first group of wireless mobile clients 108 in a first location may each display a first luminescent pattern at a time interval T1 and a second luminescent pattern at a time interval T2, whereas a second group of wireless mobile clients 108 in a second location may not display any luminescent image at time T1, but may each then display the first luminescent pattern at time T2. Thus, by varying the luminescent patterns displayed by a group of wireless mobile clients over time, a sense of motion may be imparted to a crowd or audience.

Crowd patterns may originate from a number of sources both static and dynamic. For example, a number of pre-programmed crowd patterns (or luminescent patterns) may be stored in one or more wireless mobile clients (e.g. in static memory) for later display in cooperation with addition wireless mobile clients. Alternatively, one or more dynamic sources may be utilized to facilitate generation of one or more crowd patterns. For example, a video camera could be used in association with communication server 102 to capture image sequences to be displayed as one or more crowd patterns. Communication server 102 would process sequences of video images received from the video camera an subdivide each image into portions that may then be transmitted as luminescent patterns to individual wireless mobile clients based upon their location. The devices would then display each respective portion such that the crowd pattern resembles the original video image. Crowd patterns may approximate a wide variety of other visual queues including stage light shows, "screen savers", color organs and so forth.

Each luminescent pattern displayed by a single wireless mobile client essentially forms a constituent portion, or "picture element" of the larger crowd pattern. In one embodiment, wireless mobile clients 108 cooperatively display luminescent patterns via one or more light emitting devices (LED) disposed on or within or connected to each respective wireless mobile client. As used herein, the terms "light emitting device" and "LED" generally refer to a device or component equipped to illuminate to form one or more constituent portions of a luminescent pattern. LEDs may include, but are not limited to devices such as light emitting diodes and components such as backlit displays. In one embodiment, LEDs may include multicolor LEDs to enhance the variety of patterns and imagery conveyed through the luminescent patterns. The greater the number of wireless mobile clients that participate in displaying a particular crowd pattern, the greater the density and corresponding resolution of the crowd pattern. The lower the number of wireless mobile clients that participate in displaying a particular crowd pattern, the lower the density and corresponding resolution of the crowd pattern. For example, if 10,000 wireless mobile clients each use a backlit display as a light-emitting device in the display of a crowd pattern, the equivalent resolution could be said to be 10,000 picture elements. However, if each wireless mobile client were to contain 10 light emitting diodes as a light-emitting device in the display of a crowd pattern, the equivalent resolution could be said to be 100,000 picture elements. Generally, the greater the resolution, the more realistic an animation or video sequence may appear.

In accordance with one embodiment of the invention, each of the picture elements of the crowd pattern to be displayed correspond to and are determined based upon the associated wireless mobile client's positioning relative to its location within venue 106 or relative to the location of other wireless mobile clients 108, or both. In one embodiment, select ones of wireless mobile clients 108 each only receive a location-specific luminescent pattern to be cooperatively displayed by the selected wireless mobile clients in association with other wireless mobile clients collocated at venue 106 to visually convey the larger crowd pattern. In an alternative embodiment, wireless mobile clients 108 may receive multiple constituent portions of a given crowd pattern or even an entire crowd pattern (i.e. including luminescent patterns to be displayed by other wireless mobile clients), and determine which constituent portion or portions of the crowd pattern are to be displayed by a given wireless mobile client. In one embodiment, communication server 102 transmits instructions to wireless mobile clients 108 that allow a given one of wireless mobile clients 108 to determine its respective portion of the crowd pattern to be displayed.

Figure 1B:
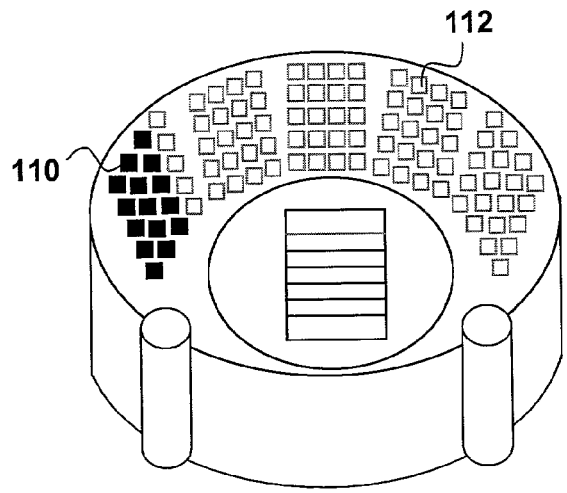
Figure 1C:
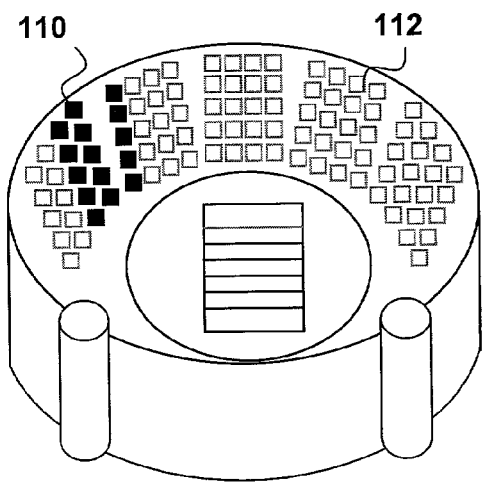
Figure 1D:
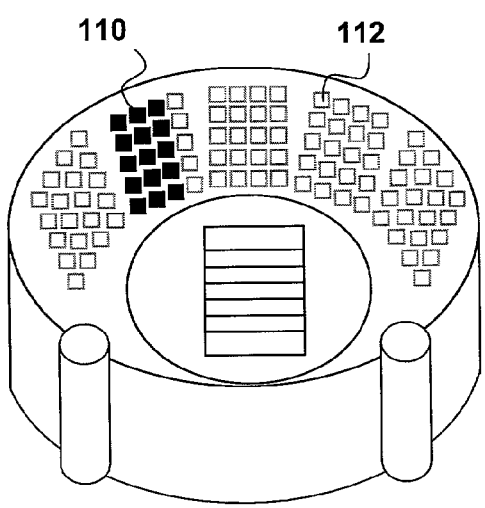

In a further embodiment of the invention, select ones of wireless mobile clients 108 each synchronously display a sequence of luminescent patterns in cooperation with others of wireless mobile clients 108 to visually convey an animated crowd pattern or sequence of patterns. In accordance with various embodiments of the invention, communication server 102 facilitates the synchronization of luminescent displays between wireless mobile clients 108 participating in the display of one or more animated crowd patterns. FIGS. 1(B–D) together illustrate an exemplary animation of a crowd pattern at various stages in time. FIG. 1B represents a first illumination pattern corresponding to a first time frame, whereas FIGS. 1C and 1D illustrate second and third illumination patterns corresponding to second and third time frames of the animation, respectively. In the exemplary animation of FIGS. 1(B–D), a first set of wireless mobile clients (110) are shown illuminating their respective LEDs in a first color (e.g. red), and a second set of wireless mobile clients (112) are shown illuminating their respective LED's in a second color (e.g. yellow), to simulate a 'wave' traversing the stadium.

Figure 2:
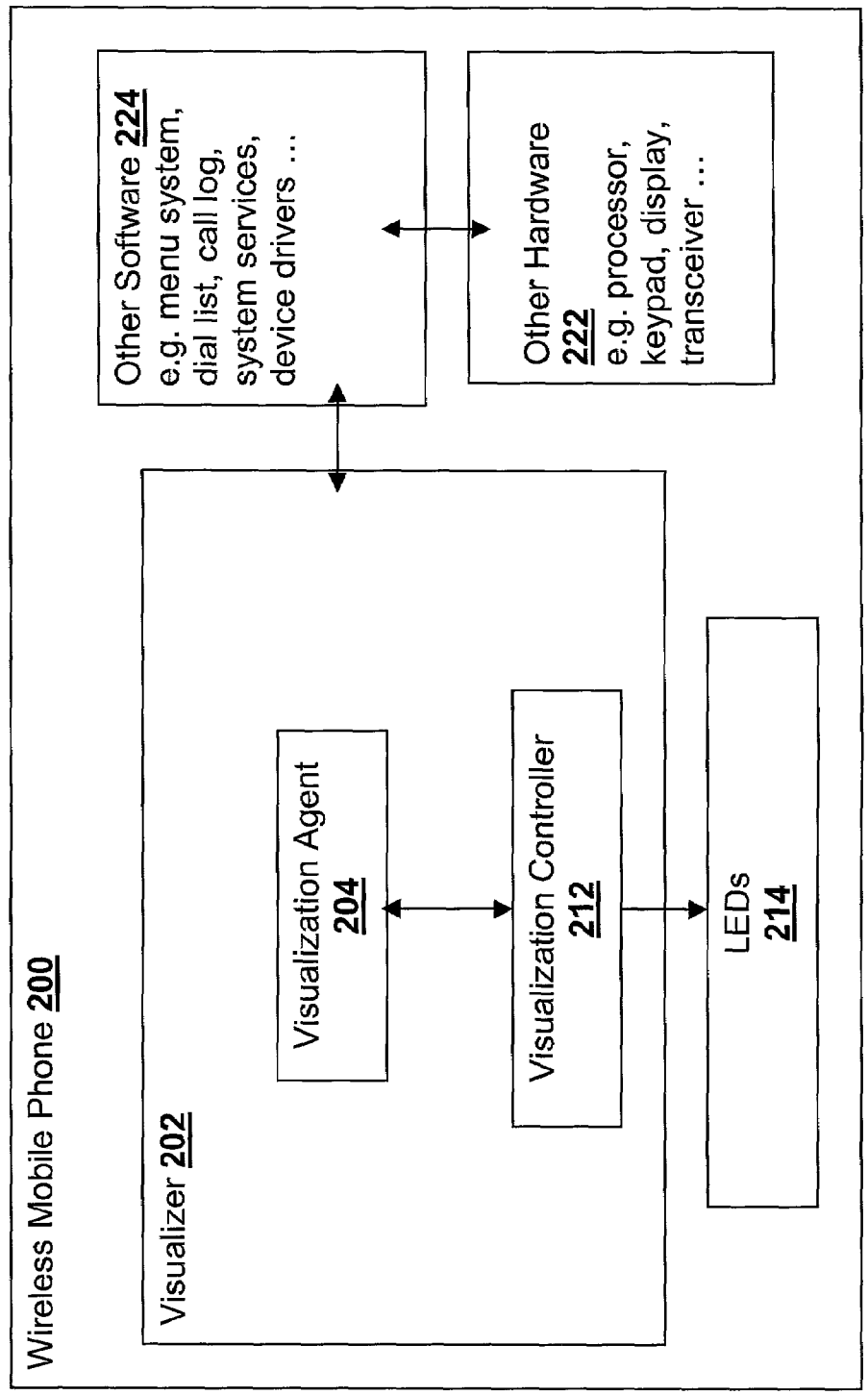
FIG. 2 illustrates a functional view of the visualization feature of present invention for wireless mobile phones, in accordance with one embodiment.

Reference is now drawn to FIG. 2, wherein a block diagram illustrating a functional view of one embodiment of a wireless mobile phone incorporating the teachings of the present invention, is shown. As illustrated, wireless mobile phone 200 is provided with a number of light emitting devices ("LEDs") 214, and visualizer 202 including visualization controller 212. For the illustrated embodiment, visualizer 202 also includes client visualization agent 204.

LEDs 214 are employed by visualizer 202 to effectuate visualization of various luminescent patterns to enhance and supplement a user's experience in using wireless mobile phone 200. More specifically, the desired visualizations are effectuated by visualization controller 212 selectively activating and de-activating selected ones of LEDs 214 in selected manners, as requested by the requesters it serves, such as client based visualization agent 204 and one or more complimentary server based visualization agents.

Beside LEDs 214 and visualizer 202, for the illustrated embodiment, wireless mobile phone 200 also includes other hardware and software components 222 and 224. Other hardware components 222 include, in particular, a microprocessor for processing instructions, an input keypad for entering data and commands, a visual display for displaying information for the user, and a transceiver for sending and receiving signals wirelessly. Other software components 224 include, in particular, corresponding device drivers (e.g. for controlling the input keypad and the visual display), system services (e.g. graphics and audio services), various applications (e.g. dial list, call log, and so forth), and an optional browser (e.g. for accessing the WWW).

Figure 7B:
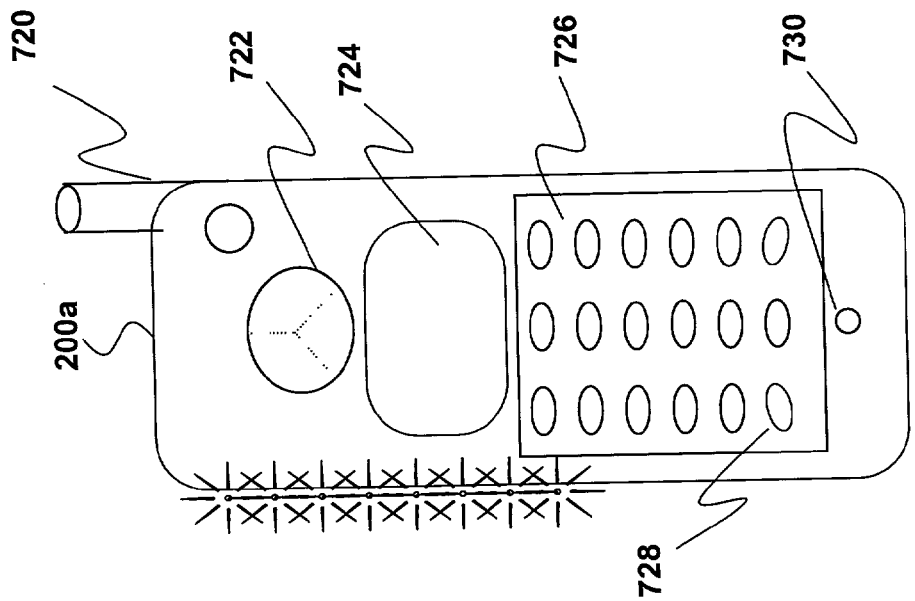
FIGS. 7A–7B illustrate an external view of a wireless mobile phone 200a, incorporated with the visualization teachings of the present invention, in accordance with one embodiment.
Figure 7A:
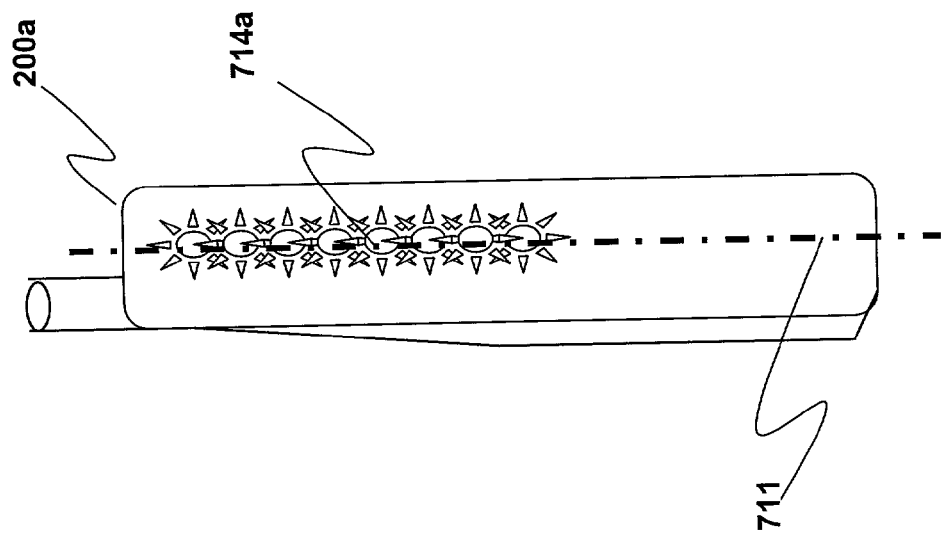

The number of LEDs 214 to be employed as well as the manner in which they may be arranged are embodiment or configuration dependent. In one embodiment, a single column of LEDs 214 disposed on a side surface of wireless mobile phone 200 (as illustrated by FIG. 7A) is employed. In another embodiment, a collection of LEDs 214 "integrally" arranged around or under the input keys of wireless mobile phone 200 (as illustrated by FIG. 8A) or a collection of LEDs 214 "integrally" arranged on or around an antenna of wireless mobile phone 200 may be employed. In a further embodiment, an LED in the form of a backlit display is employed to provide cooperative luminescent displays. In yet another embodiment, the LEDs may be disposed within a wireless client device having a translucent or transparent case such that when activated, light shone from the LEDs are perceivable through the case. In general, more variations, patterns and manners of visualization may be effectuated if more LEDs 214 are employed. However, for each embodiment or configuration, the number of LEDs 214 employable may be constrained by cost, as well as by the spatial limitations imposed by the physical dimension and the number of other features included with the particular embodiment/configuration of wireless mobile phone 200.

In one embodiment LEDs 214 represent light emitting diodes, which may be preferred for their relatively low power consumption and compactness in size. Together, these attributes allow a greater number of individually illuminable light sources to be employed. In turn, the greater number of illuminable sources allows more variations in the manner the illuminable light sources may be arranged and disposed. However, in alternate embodiments, other light sourcing elements may also be employed for the practice of the present invention. Accordingly, the term "LEDs" as used herein and in the claims are to be broadly construed, and given its conventional meaning as well as an expansive meaning including light sourcing elements with like attributes.

As described earlier, visualization controller 212 is employed to perform the earlier described selective activation and deactivation of selected ones of LEDs 214 in selected manners to visually convey the luminescent imagery of the present invention. For the illustrated embodiment, visualization agent 204 is responsible for invoking visualization controller 212 to direct the activations and deactivations of LEDs 214 to achieve the desired visualization for a corresponding luminescent pattern. More specifically, visualization agent 204 is responsible for invoking visualization controller 212 to direct LEDs 214 to effectuate visual conveyance of various luminescent patterns.

For the illustrated embodiment, visualizer controller 212 advantageously offers at least two manners in which a visualization agent may request a visualization operation or operations to be performed. These two manners include a first manner where a singular round of activation and deactivation of LEDs 214 may be requested, and a second manner where a number of rounds or sequences of activation and deactivation of LEDs 214 may be simultaneously requested via a single request.

In one embodiment, the first manner is requested via a function call to visualization controller 212, providing visualization controller 212 with the identifiers of LEDs 214 to be activated, as well as optional durations of activation. For this embodiment, all other unspecified LEDs 214 are assumed to remain deactivated. In an alternate embodiment, visualization agent 204 may send commands to visualization controller 212 at regular or irregular intervals with each command including a specification stipulating whether each LED is to be set to on or off. In alternate embodiments, group specifications in particular, an "ALL" LED group may be advantageously supported. Additionally, in various embodiments, the intensity or brightest of each LED may be specified (e.g. by way of an intensity/brightness index in the range e.g. of 0 through 16). Further, for multi-colored LEDs, the color may be specified.

In one embodiment, the second manner is requested via a function call to visualization controller 212, providing visualization controller 212 with a pointer to a starting location in the included memory of wireless mobile phone 200, where a data structure containing a series of rounds or cycles of activation and deactivation specifications is stored. The function call, in addition to the pointer, also includes the size of the data structure. In alternate embodiments, a predetermined end of structure demarcation may be employed, in lieu of a size specification. In other embodiments, visualization controller 212 may be given an encoded set of instructions used to produce visualization picture elements for one or more round/cycle (i.e. "Frame"). For each frame of activation and deactivation, the LEDs to be turned on and off are identified. For example, for a row of eight LEDs, the LEDs to be turned on and off for a round or cycle may be specified by the "vector" [01010111] with "0" denoting an "off" state and "1" denoting an "on" state. In alternate embodiments, other manners of specification as well as other manners of providing the specification may be employed instead. Further, as before, the intensity/brightness as well as color (in the case of multi-color LEDs) may be specified.

The above-described approaches are just two exemplary approaches where a visualization agent may request visualization controller 212 to selectively activate and deactivate LEDs 214 on its behalf. Further in the illustrated embodiment, visualization agent 204 is provided to facilitate the conveyance of the desired visualizations, such that the desired visualizations may be achieved without requiring or merely requiring a relatively small amount of modifications to the main line logic or operational components of wireless mobile phone 200. However, in embodiments where the earlier described "request" interface of visualization controller 212 is practiced, the visualization services offered by visualization controller 212 may also be directly invoked by the other components of wireless mobile phone 200 instead, should direct incorporation of the required logic into these other components of wireless mobile phone 200 to practice the present invention be desirable. Thus, generically, a visualization requester, whether it is an "intervening" agent like visualization agent 204 or a functional "principal" (such as the component responsible for incoming call notification), may be referred to as a visualization "client".

Figure 3:
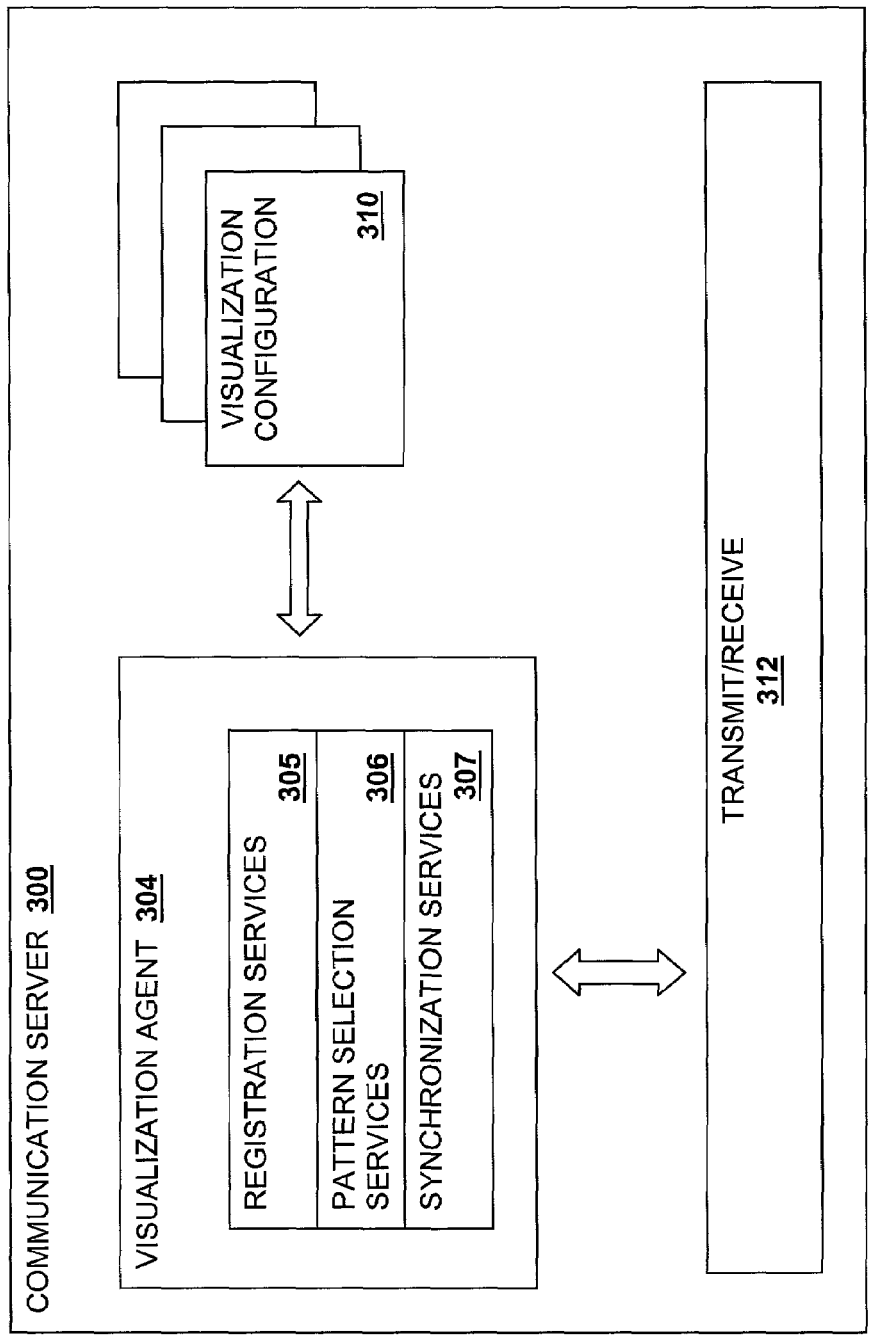
FIG. 3 is a block diagram illustrating a functional view of one embodiment of a communication server incorporating the teachings of the present invention.

FIG. 3 is a block diagram illustrating a functional view of one embodiment of a communication server incorporating the teachings of the present invention. As illustrated, in accordance with the present invention, communication server 300 includes server visualization agent 304 providing registration services 305, pattern selection services 306, and synchronization services 307. Communication server 300 further includes visualization configuration records 310 and transmit/receive interface 312. Although communication server 300 may include additional functional elements such as an operating system, various device drivers and additional system services, these elements have been omitted from the illustrated embodiment for the purpose of clarity.

In accordance with the teachings of the present invention, communication server 300 facilitates the display of one or more luminescent patterns by participating ones of wireless mobile devices 108. In one embodiment, communication server 300 identifies which of wireless mobile clients 108 are to participate in the display of one or more luminescent crowd patterns, and which picture elements are to be displayed by each of the participating ones of wireless mobile clients 108. In one embodiment, communication server 300 determines which constituent luminescent pattern(s) of the larger crowd pattern are to be transmitted to the participating ones of wireless mobile clients 108. Such a determination may be made e.g. based upon the relative location of the participating wireless mobile clients 108 as determined with respect to the location of other wireless mobile clients, or with respect to a fixed location within a given venue. In another embodiment, communication server 300 may transmit an entire crowd pattern to one or more wireless mobile clients leaving the responsibility of luminescent pattern selection up to the individual wireless mobile client. By doing so, communication server is freed from the processing requirements associated with determining which one or more constituent luminescent pattern(s) are to be displayed by a given wireless mobile client.

Registration services 305 are responsible for identifying which one or more wireless mobile clients are to participate in the luminescent display of one or more crowd patterns, and to store identifiers for each such participating wireless mobile client in e.g. visualization configuration records 310. In accordance with one embodiment of the invention, visualization agent 304 provides interactive voice response services, which may be responsive to voice and/or DTMF tones supplied by users of wireless mobile clients. In such an embodiment, users of wireless mobile clients 108 may call a generic dial number associated with communication server 300 to register himself or herself as participating in the display of one or more crowd patterns. User registration may be accomplished e.g. by the user reacting to voice prompts guiding the user through a call tree until an appropriate selection has been made. For example, a user may be able to enter an event code (e.g. '126') representing the related event (and by association, the venue), which is then associated with a user-specific identifier. In one embodiment, the user-specific identifier is the dial number associated with the user's wireless mobile client, which may be obtained through e.g. a dialed number identification service (DNIS). In other embodiments, users of wireless mobile clients 108 may register as participating in the display of one or more crowd patterns via one or more packet-based wireless technologies such as the web access protocol (WAP) messages, as well as through short message service (SMS) messages, for example.

Once the user has been identified to communication server 300, the user may continue by providing the user's location to communication server 300. For example, the user may provide their respective venue seating information (i.e. section number, row number, seat number and so forth) to communication server 300, which is further stored in visualization configuration records 310 in association with the user-specific identifier. In other embodiments, users' locations may be determined by positional systems such as GPS that are based on triangulation. However, location information will be only as accurate as is allowed by the particular positional system based upon technological limitations as well as any artificial accuracy limitations that may be imposed by a group such as e.g. the Government or military. In an alternative embodiment, rather than calling a generic dial number to register as a participating user, users may call an event-specific dial number pre-associated with a particular event and/or venue. Accordingly, the user may not be required to provide an event and/or venue specific code when registering with communication server 300.

In certain embodiments, the communication session established between a wireless mobile client and communication server 300 is terminated once the user has registered their identity (and perhaps location) with the communication server, and the appropriate one or more luminescent patterns have been received by the wireless mobile client from the communication server. In other embodiments, the communication session established between a wireless mobile client and communication server 300 is sustained for a longer duration. In one embodiment, the communication sessions between communication server 300 and wireless mobile clients 108 may be sustained for an extended duration such that communication server 300 may periodically transmit new patterns or sequences to the crowd. For example, communication server 300 may transmit a single pattern every $\frac{1}{10}$ of a second in order to maintain synchronization between wireless mobile clients 108 and communication server 300. In other embodiments, the communication sessions between communication server 300 and wireless mobile clients 108 may be sustained for an extended duration to allow for further interaction (i.e. feedback) between the user and the communication server. More specifically, participating (i.e. registered) users within a given venue may be verbally solicited with a question that is posed to the crowd via the public address system or through the one or more wireless mobile clients. In response, the communication server may then transmit one or more luminescent patterns to the responding wireless mobile clients based upon the users' respective responses to the questions. For example, spectators at a sporting event may be asked trivia questions about a player or sport team, or the spectators may be encouraged to make as much noise as possible. In response to the answers provided by users, or level of noise created by the crowd (e.g. on a section-by-section basis or and individual basis), communication server 300 would provide an appropriate luminescent pattern for display by each respective wireless mobile client.

Referring once again to FIG. 3, pattern selection services 306 assists in determining which luminescent pattern or patterns are to be transmitted to wireless mobile clients 108. The patterns to be transmitted to a given wireless mobile client may be determined based upon one or more criteria including, but not limited to venue identification, event type, wireless mobile client location, dial number used during registration, feedback from the wireless mobile client, and so forth. In one embodiment, representations of constituent luminescent patterns are stored within visualization configuration records 310 for retrieval and transmission to one or more wireless mobile clients 108.

From time to time, it may be desirable to synchronize one or more luminescent patterns to be displayed by multiple wireless mobile clients, or sequences of luminescent patterns to be displayed by one or more wireless mobile clients. For example, to impart a sense of animation within a given crowd pattern, the same luminescent pattern or sequence of patterns may be displayed by differently located groups of wireless mobile clients at differing times (i.e. synchronized by location). Accordingly, it is possible to visually convey a crowd pattern in the form of an animation or a word that is displayed e.g. letter by letter rather than the entire word appearing in its entirety at a single point in time. Synchronization services 307 of communication server 300 facilitate such luminescent pattern synchronization amongst one or more wireless mobile clients.

In one embodiment of the present invention, synchronization services 307 transmit the current time and a start time to each wireless mobile client for each sequence of luminescent patterns to be displayed. Additionally, a delay time may be included that specifies an amount of time that a wireless mobile client is to delay between the display of one luminescent pattern and the next. For example, communication server 300 may transmit a sequence of ten luminescent patterns to each wireless mobile client participating in one or more crowd patterns. Included with the sequence, or subsequent to the sequence, would be a time at which each respective wireless mobile client should begin the display of the sequence of luminescent patterns as well as a duration (e.g. 0.1 sec) for which each respective wireless mobile client is to delay before displaying the next luminescent pattern included within the sequence of patterns. The delay duration may vary by device, and the amount of delay time that elapses between the display of one luminescent pattern and the next need not be constant as each pattern may be associated with its own measure of delay. Furthermore, the delay durations may be determined based upon one or more factors/properties including the distance between a given client device and another (e.g. previous/next) client device. Accordingly, the perceived motion of the overall image may remain constant, or alternatively, the perceived motion may accelerate or decelerate if desired.

In another embodiment, synchronization services 307 periodically broadcast timing signals that are spaced apart over a stipulated interval such as e.g. 0.1 seconds. The timing signals need not be transmitted using the same transport medium as the luminescent patterns. In one embodiment, the timing signals are transmitted over Radio Frequency (RF) via a low-power radio transmitter located at the venue, whereas the luminescent patterns are distributed via a packet-based transport. In other embodiments, the luminescent patterns and timing signals are transmitted using the same transport medium. When a wireless mobile client having received a sequence of luminescent patterns also receives such a timing signal, the wireless mobile client displays the next luminescent pattern in the sequence. In order to address the issue of wireless mobile clients becoming unsynchronized due to one or more clients missing one or more timing signals (e.g. due to a temporary loss of service), each timing signal may include a sequence number corresponding to one luminescent pattern in the sequence of patterns. Accordingly, if a wireless mobile client misses one or more timing signals, the client can skip the display of the luminescent pattern(s) corresponding to the missed signal(s).

In yet another embodiment, synchronization services 307 of communication server 300 may provide synchronization data including data to indicate delays between luminescent displays as well as a benchmark synchronization signal to indicate where within a display sequence a wireless mobile client should be with respect to its progress. If the wireless mobile client were to fall behind (or to speed up) with respect to the specified delay and/or display times, the wireless mobile client may rely upon the benchmark synchronization signal for timing adjustment purposes.

FIGS. 4A–4C illustrate various example data organizations suitable for use to store various visualization configuration related information for practicing the present invention, in accordance with one embodiment. More specifically, FIGS. 4A–4C represent data that may be provided to a communication server by a wireless mobile client during a registration process, as well as data representations of one or more luminescent patterns pre-defined within communication server 300.

FIG. 4A illustrates a data organization containing event code field 402, locator reference field 404, client identifier field 406 and display pattern field 408. As described above, event code field 402 identifies a particular event and/or venue to a communication server, whereas client identifier field 406 identifies a particular client to the communication server. In accordance with one embodiment of the invention, the data appearing in the table of FIG. 4A (with the exception of client identifier 406) is pre-stored for use in association with an interactive voice response service of the communication server accessible to one or more wireless mobile clients via a generic dial number. In alternate embodiments, the data appearing in the table of FIG. 4A is accessible to one or more wireless mobile clients via a web interface and e.g. a specified URL, as well as other non-voice related means. By calling the generic number for example, wireless mobile clients are prompted to identify an event code, and optionally a locator reference to the system.

Either one or both of the event and locator reference codes may be provided to users through e.g. an event publication such as a brochure or ticket stub, or through a preprogrammed storage medium integrated with an interchangeable covering of e.g. a wireless mobile phone (also referred as "active" skin for certain embodiments as described e.g. in U.S. provisional patent application No. 60/306,326), which when used in combination with a given one of wireless mobile clients 108, facilitates automatic registration. In one embodiment, a user is granted the right to download/access data associated with the display of one or more luminescent patterns by virtue of their paying the admission price to an associated event and/or by purchasing an identified "active" skin.

Upon providing such event and locator data to the communication server for example, the user may be requested for a client identifier, or the identifier may be obtained automatically through e.g. DNIS or via embedded codes within an "active" skin. Once obtained, the client identifier is stored in association with the locator reference code for subsequent transmission of one or more luminescent patterns (i.e. as indicated by display pattern field 408) to the wireless mobile client. If an event-specific dial number is used to access the voice response system rather than a generic dial number being used, event code field 402 may be omitted. Likewise, if an event-specific web interface is utilized, event code field 402 may similarly be omitted.

FIG. 4B illustrates a data organization further containing control vector field 410. In accordance with one embodiment, data within control vector field 410 is pre-stored as representations of luminescent patterns to be displayed, either independently or in sequence as an animation. For example, if a predefined luminescent pattern identified by the numeral "1" is to be displayed (e.g. as indicated by pattern display field 408), communication server 300 performs a lookup to determine control codes needed to effectuate the desired luminescent patterns. In FIG. 4B, the control codes are illustrated as a group of binary "1"s and "0"s with "0" denoting an "off" state and "1" denoting an "on" state for the light emitting devices (e.g. LEDs) of a wireless mobile client. Depending upon implementation, the control vector may indicate operating states and intensities for single color or multicolor LEDs.

Lastly, FIG. 4C illustrates another data organization showing that not only may the luminescent patterns to be displayed vary by event (as shown in FIG. 4B), but the luminescent patterns to be displayed may also vary by location of the wireless mobile device. The luminescent patterns may also vary according to other criteria, such as the capabilities of the device (e.g. as discovered during a previous negotiation period with a server or in real-time by transmitting several instruction sets and having the device choose the correct one) or what services/features the owner of the device has purchased, asked for, enabled, or otherwise passively or actively selected.

Figure 5:
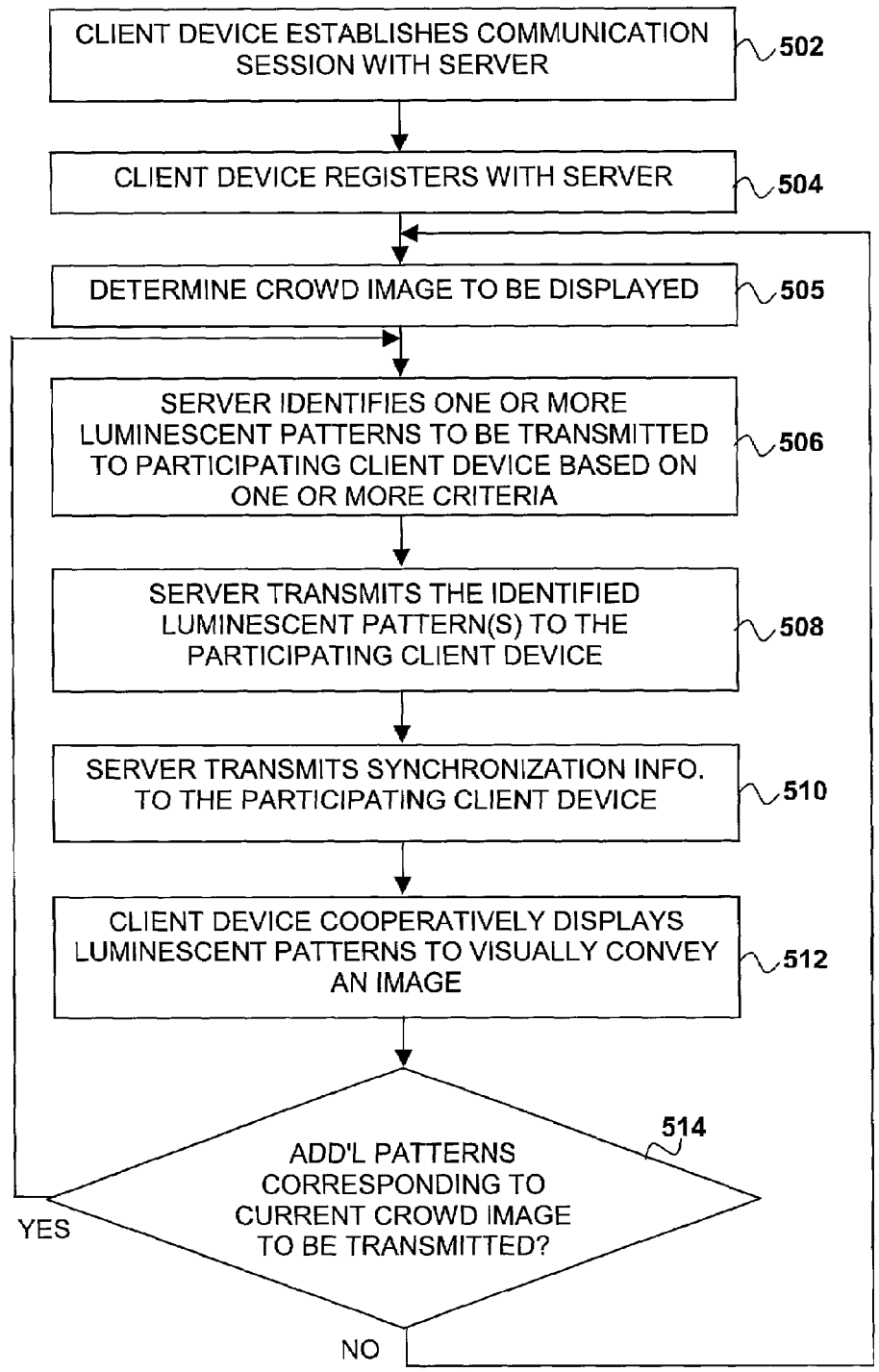
FIG. 5 illustrates an exemplary operational flow of one embodiment of the present invention.

FIG. 5 illustrates an exemplary operational flow of one embodiment of the present invention. As illustrated in FIG. 5, a wireless mobile client device establishes a communication session with a communication server, block 502. Once the wireless mobile client is in communication with the communication server, the wireless mobile client registers itself with the communication server, block 504. As described above, wireless mobile clients may each register with the communication server through entry of a client-specific identifier such as a dial number associated with a particular wireless mobile client. Alternatively, the communication server may automatically determine client-specific identifiers.

Once a wireless mobile client has registered with the communication server, the communication server determines a crowd image or animation to be displayed, block 505. Next, the communication server identifies one or more of the luminescent patterns that comprise the crowd image for transmission to the particular wireless mobile client, block 506. Such a determination may be based upon one or more criteria such as the location of wireless mobile client including venue and seating location, the overall crowd pattern to be conveyed, as well as the capabilities of the particular wireless mobile client. More specifically, the communication server may store data representing a hardware configuration (e.g. amount of memory, number of LEDs, single or multicolor LEDs, etc) for each wireless mobile client, and may determine which luminescent patterns are to be transmitted and subsequently displayed by the wireless mobile client based at least in part upon the stored hardware configuration. For example, if the communication server identifies a particular wireless mobile client as having a certain memory capacity that is greater than an established threshold, the communication server may opt to transmit a sequence of luminescent patterns to the wireless mobile client rather than transmitting one luminescent pattern at a time. Such configuration information may be provided to the communication server in a number of ways including by way of voice or DTMF input from a user.

Once the appropriate luminescent patterns have been identified, the communication server then transmits the luminescent patterns to the wireless mobile client, block 508. In the illustrated embodiment, the communication server further includes synchronization information with the luminescent patterns, block 510. The synchronization information serves to synchronize the cooperative display of one or more luminescent patterns amongst multiple wireless mobile clients. Once a wireless mobile client receives the one or more luminescent patterns, the client displays the luminescent pattern(s) to visually convey the larger crowd pattern based upon any synchronization constraints that may have been imposed by the communication server, block 512. In accordance with the illustrated embodiment, if there are additional patterns to be transmitted to the wireless mobile client (block 514), the wireless mobile client continues to receive one or more additional luminescent patterns (block 506) while the wireless mobile client displays the one or more original luminescent patterns (block 512) (described further with respect to FIG. 6 below). If there are not any additional patterns to be transmitted to the wireless mobile client, the next crowd image to be displayed is then determined, (block 505).

Variations to the above-described operational flow are also contemplated. For example, if at block 506, the communication server identifies e.g. 100 patterns to be transmitted to a wireless mobile client, at block 508 the communication server may transmit all 100 patterns. Accordingly, at block 510, the communication server may then identify (and transmit) synchronization information that instructs the client to display each of the patterns at a given interval such as e.g. 0.1 sec. Finally at block 514, the communication server would determine the next crowd image to be displayed.

Additionally, in the event that the crowd image approximates a live video feed, or is representative of a tape delayed video stream for example, the various luminescent patterns are determined at block 506 such that each luminescent pattern represents one still-image frame of the source video. At block 508, the communication server transmits all patterns to the client where they are then displayed (block 512)

in accordance with any synchronization information that may also be stipulated by the communication server. In one embodiment of the invention, the processes associated with blocks 506–514 are repeated in parallel for multiple sets of clients, where those clients receiving the same patterns and synchronization data represent a set of clients.

Figure 6:
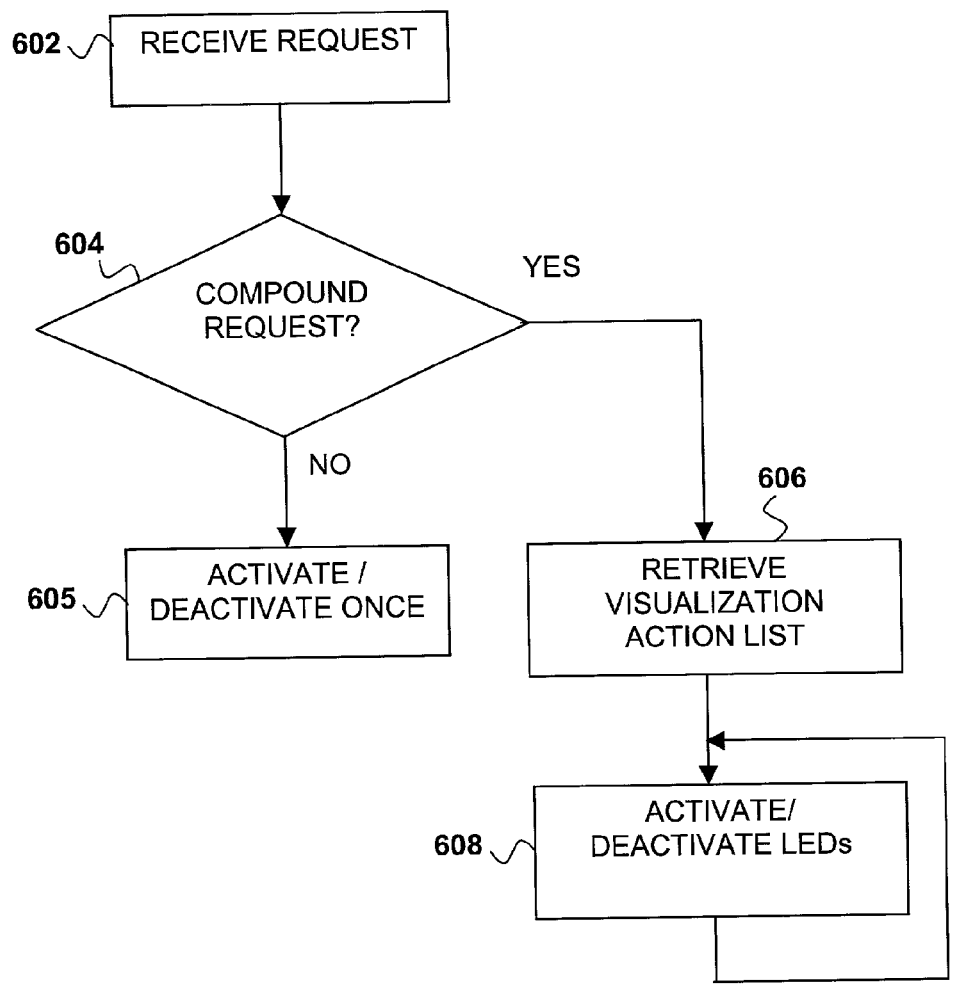
FIG. 6 illustrates an exemplary operational flow performed by visualization controller 212 and visualization agent 204 of wireless mobile phone 200 to display one or more luminescent patterns, in accordance with one embodiment.

FIG. 6 illustrates an exemplary operational flow performed by visualization controller 212 and visualization agent 204 of wireless mobile phone 200 to display one or more luminescent patterns, in accordance with one embodiment. As illustrated, upon receipt of a request to selectively activate or deactivate selected ones of LEDs 214 in selected manners, block 602, visualization controller 212 determines if the request is of the first type (i.e. a single round request type), or of the second type (i.e. the multiple rounds/cycles request type), block 604. The distinction of the two types may be explicitly specified or implicitly inferred based at least in part on the format and/or substance of the calling parameters included with the function call. If the request is determined to be of the first type (i.e. a single round request type), visualization controller 212 activates and/or deactivates selected ones of LEDs 214 as requested, block 605. If the request is determined to be of the second type (i.e. a multiple round/cycle request type), after retrieving the "specification" for the activations/deactivations to be performed, block 606, visualization controller 212 activates and/or deactivates selected ones of LEDs 214 as requested, block 608. For a multiple round request, the activation/deactivation operation of LEDs 214 of block 608 is iteratively performed for a sufficient number of times to achieve the selective activation/deactivation requested.

Although the present invention has been described herein as utilizing a communication server to transmit representations of the luminescent data to the wireless mobile clients, such luminescent pattern representations may also be pre-provided with the wireless mobile clients, or retrieved from a storage medium attached to or integrated with a wireless mobile client. In one embodiment, an interchangeable covering of e.g. a wireless mobile phone ("active skin") may be used to provide such luminescent pattern representations. In other embodiments, other devices that the wireless mobile clients are capable of communicating with may provide the luminescent representations, or the representations may be entirely generated within the wireless mobile clients.

Having now described the present invention from a function view, in particular, the various relevant operational flows, we turn now to describe various exemplary embodiments for disposing and configuring the various elements for practicing the luminescent visualizations of the present invention. FIGS. 7A–7B illustrate an external view of a wireless mobile phone 200a, incorporated with the visualization teachings of the present invention, in accordance with one embodiment. More specifically, FIG. 7A illustrates a side view of wireless mobile phone 200a, whereas FIG. 7B illustrates a front view of wireless mobile phone 200a.

For the illustrated embodiment, as alluded to earlier, wireless mobile phone 200a includes antenna 720, speaker 722, visual display 724, input key pad 726 having input keys 728, microphone 730, and so forth. More importantly, wireless mobile phone 200a includes LEDs 714a disposed on a side exterior surface of the body of wireless mobile phone 200a. In alternate embodiments, LEDs 714a may be disposed on or in other exterior surfaces of the body of the wireless mobile phone 200a instead. These other exterior surfaces may include the top or bottom exterior surface, and the front or back exterior surface. Note that by virtue of the manner content is displayed in visual display 724, the exterior surfaces corresponding to the top, bottom, side, front and bottom surface are definitively defined.

For the illustrated embodiment, LEDs 714a are disposed on the side exterior surface in a substantially columnar manner, along imaginary longitudinal axis 711. In alternate embodiments, LEDs 714a may be arranged in other configurations, e.g. in multiples of even or uneven rows and/or columns. In one embodiment, LEDs 714a are single colored LEDs of the same color. In alternate embodiments, they are single colored LEDs of different colors. In various embodiments, every three single colored LEDs of different colors (e.g. one Red, one Green, and one Blue) are grouped, functionally forming multiple 3-LED groups to facilitate manifestation of other non-basic colors, such as orange, yellow and so forth. In yet other embodiments, at least some of LEDs 714a are multi-colored LEDs. A multi-colored LED is a LED that is capable of emitting light in a selected subset of one or more of a plurality of colors.

Figure 8B:
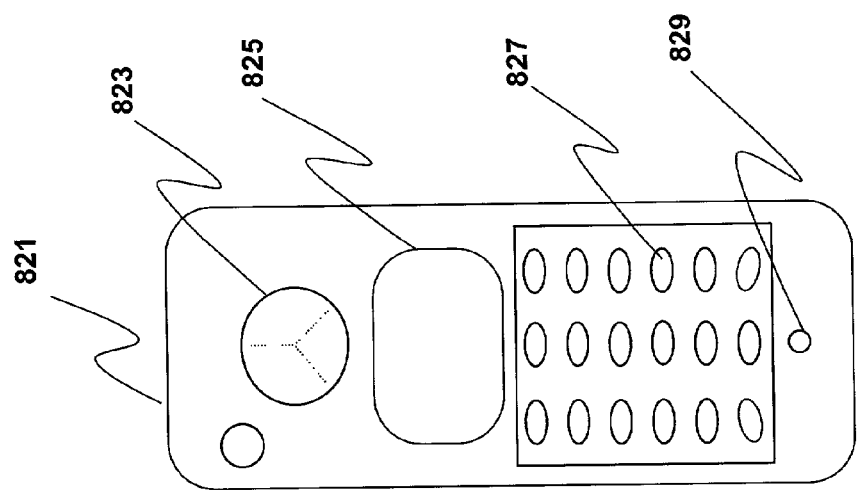
FIGS. 8A–8B illustrate an exposed view of wireless mobile phone 200b, in accordance with an alternate embodiment.
Figure 8A:
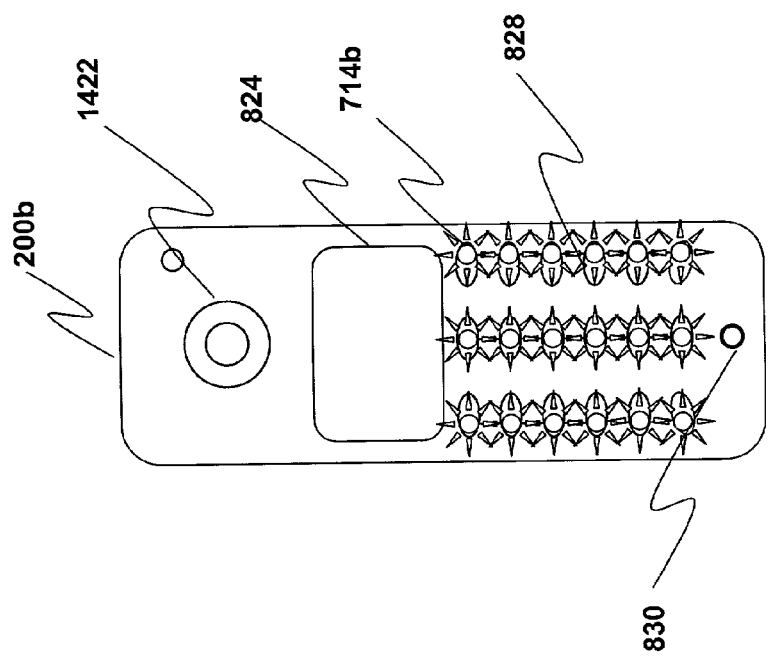

FIGS. 8A–8B illustrate an exposed view of wireless mobile phone 200b, in accordance with an alternate embodiment. More specifically, FIG. 8A illustrates an exposed front view of wireless mobile phone 200b with its front cover 821 removed, whereas FIG. 8B illustrates an exposed interior (or backside) view of front cover 821. Front cover 821 is also referred to as an interchangeable face plate.

Similar to the embodiments of FIGS. 7A–7B, wireless mobile phone 200b includes speaker 822, visual display 824, input keys 828, microphone 830, and so forth. In one implementation, wireless mobile phone 200b further includes a radio (not shown). Correspondingly, front cover (face plate) 821 has "opening" 823 for speaker 822, "opening" 825 for visual display 824, "opening" 827 for input keys 828, "opening" 829 for microphone 830, and so forth.

More importantly, wireless mobile phone 200b includes LEDs 714b disposed on the interior front surface of wireless mobile phone 200b, near or around input keys 828. With front cover (face plate) 821 in place, LEDs 714b appear to be integrally disposed with input keys 828. In other words, for the illustrated embodiment, LEDs 714b are disposed and configured as an array of light sources. Similar to the embodiment of FIGS. 7A–7B, LEDs 714b may be single colored LEDs of the same or different color. Every three different color single colored LED, such as one Red, one Green and one Blue, may be grouped to form groups of LEDs as earlier described. In alternate embodiments, at least some of LEDs 714b may be multi-colored LEDs.

As will be described in more detail below, front cover (face plate) 821 may be an "active" front cover/face plate having an electronic component wherein all or portions of the visualization teachings of the present invention are implemented. In particular, in various embodiments, "active" front cover (face plate) 821 is an "active" covering "skin" covering all or a portion of the body of wireless mobile phone 200b. For these embodiments, instead of being disposed and configured on the interior front surface of wireless mobile phone 200b, LEDs 714b may be disposed on the exterior surface of the "active" interchangeable front cover (face plate) or covering "skin" instead as described e.g. in U.S. provisional patent application No. 60/306,326.

Figure 9:
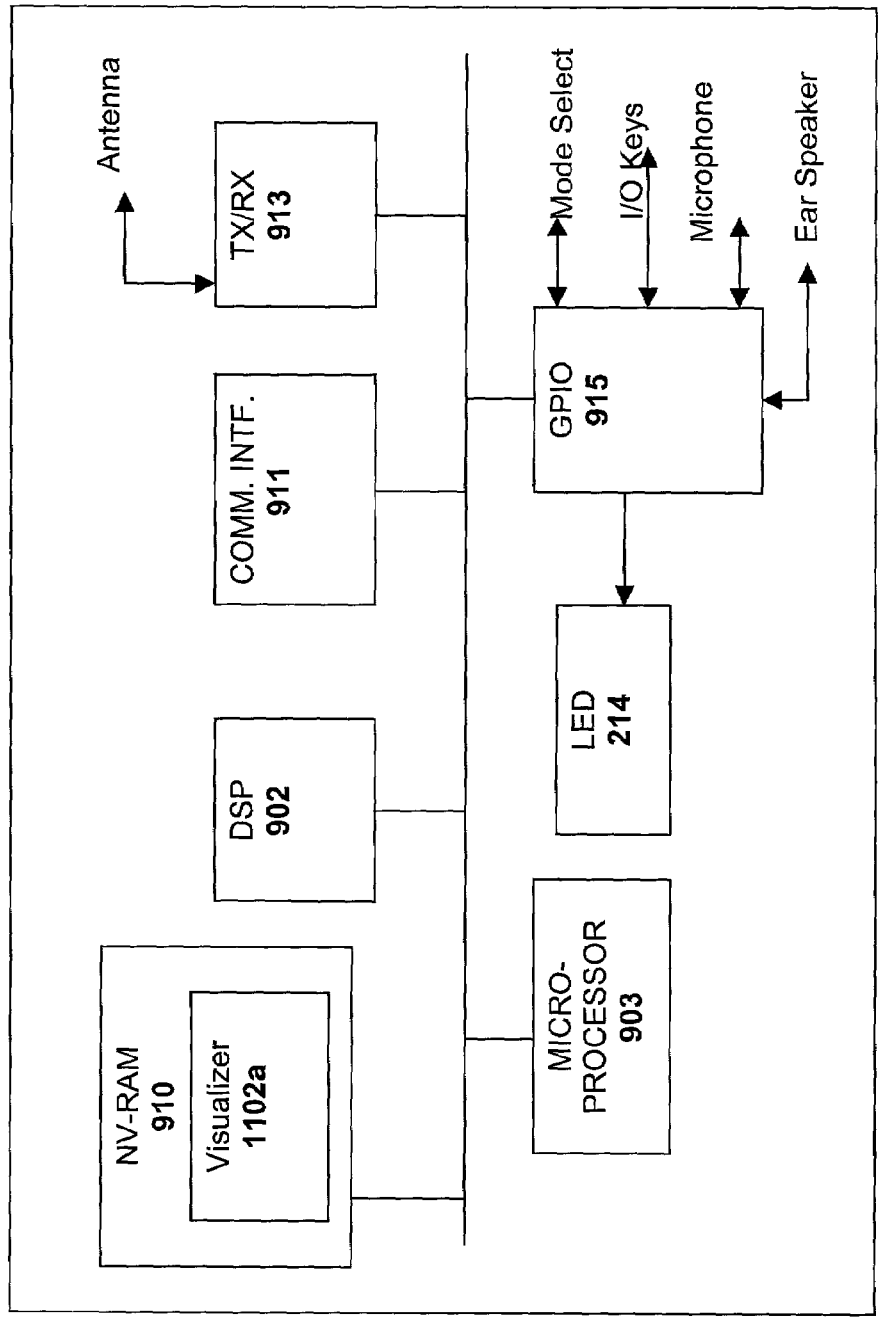
FIG. 9 illustrates an internal component view of wireless mobile phone 200, in accordance with one embodiment.

FIG. 9 illustrates an internal component view of wireless mobile phone 200, in accordance with one embodiment. As illustrated, wireless mobile phone 200 includes the earlier mentioned microprocessor 903, transmitter/receiver (TX/RX) 913 (also known as transceiver), and so forth, coupled to each other as shown. Additionally, for the illustrated embodiment, wireless mobile phone 200 further includes digital signal processor (DSP) 902, communication interface 911, and general-purpose input/output (GPIO) 915, coupled to each other and to the earlier described elements as shown. Most importantly, wireless mobile phone 200 includes LEDs 214 and non-volatile memory 910 having visualizer 202a stored therein.

In addition to the conventional functions performed by these elements, the elements are employed to practice the visualization teachings of the present invention earlier described. In particular, among the conventional functions, it is expected that TX/RX 913 may support one or more signaling protocols, including, but not limited to, code division multiple access (CDMA), time division multiple access (TDMA), global system for mobile communications (GSM), cellular digital packet data (CDPD), and so forth. Similarly, communication interface 911 may support one or more serial, parallel and/or wireless communication protocols.

In alternate embodiments, other elements may be added or one or more of the illustrated elements omitted, without departing from the spirit and scope of the present invention. Also, some or all of these elements may be present in a separate detachable device that communicates with the wireless mobile clients via an electrical or optical signaling protocol.

Figure 10:
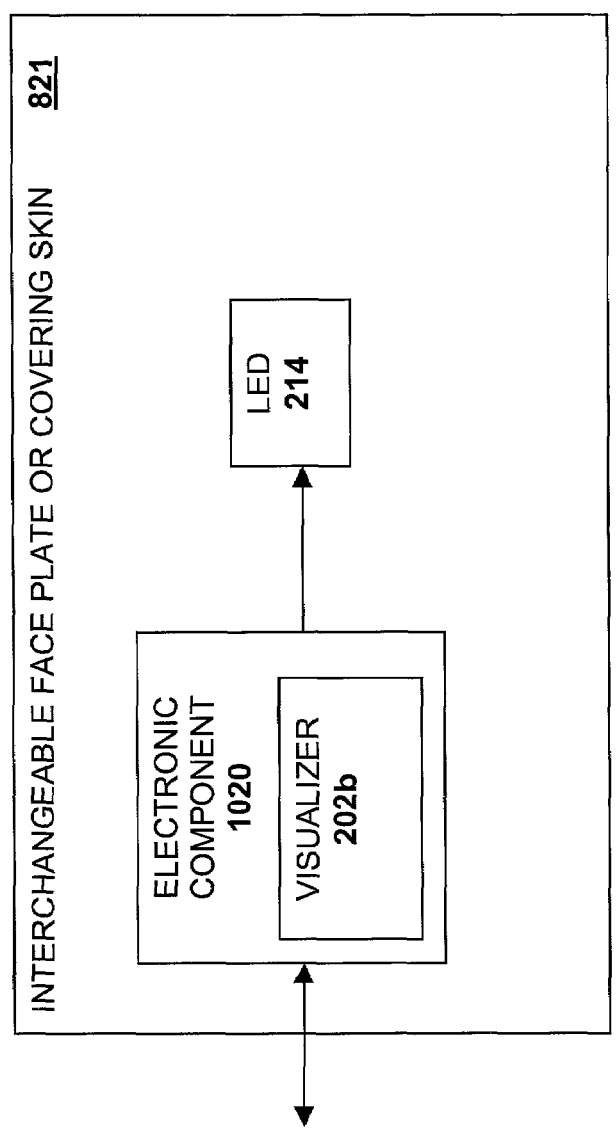
FIG. 10 illustrates an internal component view of an "active" version of interchangeable "cover" 821, in accordance with one embodiment.

FIG. 10 illustrates an internal component view of an "active" version of interchangeable "cover" 821, in accordance with one embodiment. As illustrated, "active" interchangeable "cover" 821 includes in particular, electronic component 1020. For the illustrated embodiment, interchangeable "cover" 821 also includes LEDs 214 (disposed and configured on an exterior surface).

In one embodiment, electronic component 1020 is a memory device, e.g. a subscriber identity module (SIM). In alternate embodiments, it may be a microprocessor having embedded memory. For these embodiments, at least visualization agent 204 is stored in the embedded memory. In various embodiments, the entire visualizer 1102, including visualization controller 212, as well as agent 204 is stored in the embedded memory. In other words, for these embodiments, the visualization ability is additionally provided or partially provided to wireless mobile phone 200 through the employment of an "active" interchangeable "cover" 821 (i.e. face plate or covering skin), having embedded electronic component 1020 including all or a portion of visualizer 202b.

Thus, it can be seen from the above description, methods and apparatuses for supplementing wireless mobile communications with visualization of various luminescent patterns to improve communication and entertainment value have been described. As mentioned earlier, while the present invention has been described in terms of the above-illustrated embodiments, the present invention is not limited to the embodiments described. The present invention can be practiced with modification and alternation within the spirit and scope of the appended claims. For example, predetermined luminescent patterns may be pre-provided, downloaded or retrieved from the integrated electronic component of an interchangeable cover plate ("active" skin). Further, the predetermined patterns may correspond to a theme, such as a sports theme, holiday theme, cultural theme, and the like. Thus, the description is to be regarded as illustrative instead of restrictive with respect to the present invention.

What is claimed is:

1. A wireless communication device comprising:
   a machine accessible medium having stored thereon a plurality of instructions, which when executed, cause the wireless communication device to
   receive wirelessly or retrieve locally data for one or more picture elements for one or more portions of one or more images, and
   generate a first luminescent representation of a first of the one or more portions of a first of the one or more images, based at least in part upon the received or retrieved data for the picture element(s) of the first portion of the first image, without generating luminescent representations of other portions of the first image, to contribute to a cooperative generation of a multi-part luminescent representation of the first image with other wireless communication devices; and
   a processor coupled to the storage medium to execute said instructions.

2. The wireless communication device of claim 1, wherein the instructions are further designed to enable the wireless communication device to
   determine which of the one or more portions of the first image to have a luminescent representation generated by the wireless communication device.

3. The wireless communication device of claim 1, wherein the instructions are further designed to enable the wireless communication device to determine which of said one or more images is to have a luminescent representation of one of its portions generated by the wireless communication device.

4. The wireless communication device of claim 1, wherein the instructions are designed to enable the wireless communication device to receive wirelessly said data from a wireless communication server.

5. The wireless communication device of claim 1, wherein the wireless communication device further comprises one or more LEDs, and said instructions are further adapted to
   cause the one or more LEDs to be illuminated to generate the first luminescent representation of the first portion of the first image.

6. The wireless communication device of claim 5, wherein at least a subset of the one or more LEDs is adapted to illuminate in one or more of a multiple of colors.

7. The wireless communication device of claim 1, wherein said plurality of instructions are further adapted to enable the wireless communication device to generate a second luminescent representation of a second of the one or more images, based at least in part upon the received or retrieved data for the picture element(s) of the second portion of the second image, without generating luminescent representations of other portions of the second image, to contribute to a cooperative generation of a multi-part luminescent representation of the second image with other wireless communication devices.

8. The wireless communication device of claim 1, wherein said plurality of instructions are further adapted to receive one or more synchronization signals to facilitate synchronizing said generating of the first luminescent representation of the first portion of the first image by said wireless communication device with the generations of the other luminescent representations of the other portions of the first image by said other wireless communication devices.

9. The wireless communication device of claim 8, wherein said instructions are further adapted to enable the wireless communication device to receive periodic radio frequency signals as said synchronization signals.

10. The wireless communication device of claim 8, wherein said plurality of instructions are further adapted to enable the wireless communication device to receive location information identifying a location of said wireless communication device relative to said other wireless communication devices.

11. The wireless communication device of claim 10, wherein the instructions are further adapted to enable the wireless communication device to determine which of the one or more portions of the first image to have a luminescent representation generated by the wireless communication device, based at least in part on the relative location of said wireless communication device to the other wireless communication devices.

12. A method of operation on a wireless communication device, the method comprising:
receiving wirelessly or retrieving locally data for one or more picture elements for one or more portions of one or more images; and
generating a first luminescent representation of a first of the one or more portions of a first of the one or more images, based at least in part upon the received or retrieved data for the picture element(s) of the first portion of the first image, without generating luminescent representations of other portions of the first image, to contribute to a cooperative generation of a multi-part luminescent representation of the first image with other wireless communication devices.

13. The method of claim 12, further comprising:
determining which of the one or more portions of the first image is to have a luminescent representation generated by the wireless communication device.

14. The method of claim 13, wherein the method further comprises determining which of said one or more images is to have a luminescent representation of one of its portions generated by the wireless communication device.

15. The method of claim 14, wherein said receiving or retrieving comprises receiving wirelessly said data from a wireless communication server.

16. The method of claim 12, wherein said generating comprises:
causing one or more LEDs disposed upon said wireless communication device to be illuminated.

17. The method of claim 12, further comprising:
generating a second luminescent representation of a second of the one or more portions of a second of the one or more images, based at least in part upon the received or retrieved data for the picture element(s) of the second portion of the second image, without generating luminescent representations of other portions of the second image, to contribute to a cooperative generation of a multi-part luminescent representation of the second image with other wireless communication devices.

18. The method of claim 12, wherein the method further comprises:
receiving one or more synchronization signals to facilitate synchronizing said generating of the first luminescent representation of the first portion of the first image by said wireless communication device with the generations of the luminescent representations of the other portions of the first image by said other wireless communication devices.

19. The method of claim 18, wherein said receiving of the one or more synchronization signals comprise receiving periodic radio frequency based signals.

20. The method of claim 12, wherein the method further comprises receiving location information identifying a location of said wireless communication device relative to said other wireless communication devices.

21. The method of claim 20, further comprising determining which of the one or more portions of the first image to have a luminescent representation generated by the wireless communication device, based at least in part on the relative location of said wireless communication device to the other wireless communication devices.

22. The method of claim 12, wherein said data comprises real time data.

23. The method of claim 12, wherein the first image comprises a single crowd pattern.

24. The method of claim 23, wherein the single crowd pattern is one of a sequence of crowd patterns.

25. A method of operation on a wireless communication device, the method comprising:
establishing a communication session with a communication server;
providing to the communication server, a location of the wireless communication device or data allowing the location of the wireless communication device to be determined;
receiving from the communication server, a relative location of the wireless communication device to other wireless communication devices or data allowing the relative location of the wireless communication device to other wireless communication devices to be determined; and
generating a first luminescent representation of a first portion of a first image, based at least in part on its relative location to the other wireless communication devices, without generating luminescent representations of other portions of the first image, to contribute to a cooperative generation of a multi-part luminescent representation of the first image with the other wireless communication devices.

26. The method of claim 25, wherein said providing comprises providing to the communication server a seating identifier of a venue.

27. The method of claim 25, wherein said providing comprises providing data that allow the location of the wireless communication device to be determined by way of triangulation.

28. The method of claim 25, wherein the method further comprises generating a second luminescent representation of a second portion of a second image, based at least in part on its relative location to the other wireless communication devices, without generating luminescent representations for other portions of the second image, to contribute to a cooperative generation of a multi-part luminescent representation of the second image with the other wireless communication devices.

29. The method of claim 25, wherein the first image comprises a single crowd pattern.

30. The method of claim 13, wherein the single crowd pattern is one of a sequence of crowd patterns.

31. A wireless communication device comprising:
light emitting means for emitting light;
visualization control means coupled to the light emitting means to selectively activate and deactivate the light emitting means as requested; and
visualization client means coupled to the visualization control means to request the visualization control means to selectively activate and deactivate the light emitting means to display a luminescent representation of a portion of an image, without displaying luminescent representations of other portions of the image, to contribute to a cooperative generation of a multi-part luminescent representation of the image with other wireless communication devices.

32. The wireless communication device of claim 31, further comprising:
display means, in addition to said light emitting means, for displaying alphanumeric data.

33. The wireless communication device of claim 31, wherein the wireless communication device comprises a wireless mobile phone.

34. The wireless communication device of claim 31, wherein the wireless communication device comprises a wireless PDA.

35. A method of operation on a server, the method comprising:
receiving first location information corresponding to a location of a first wireless communication device;
determining, based at least in part upon the first location information, data associated with a first portion of an image;
receiving second location information corresponding to a second location of a second wireless communication device;
determining, based at least in part upon the second location information, data associated with a second portion of the image; and
transmitting correspondingly and mutually exclusively the data associated with the first portion of the image to the first wireless communication device, and the data associated with the second portion of the image to the second wireless communication device, to facilitate the first and second wireless communication devices to correspondingly generate luminescent representations of the first and second portions of the image to contribute to a cooperative generation of a multi-part luminescent representation of the image by a plurality of wireless communication devices, including the first and the second wireless communication devices.

36. The method of claim 35, wherein at least one of the first location information and the second location information comprise seating location information of a venue.

37. The method of claim 35, wherein said transmitting comprises
transmitting data associated with all portions of the image to both the first and second wireless communication devices, accompanied with data allowing the first and the second wireless communication devices to identify and mutually exclusively generate luminescent representations the first and second portions of the image, respectively, instead.

38. The method of claim 37, further comprising:
transmitting synchronization information to the plurality of wireless communication devices to facilitate synchronizing the corresponding generations of the luminescent representations of the various portions of the image by the various wireless communication devices.

39. The method of claim 35, further comprising:
receiving the image from a camera.

40. A communication server comprising:
a machine accessible medium having stored thereon a plurality of instructions, which when executed, provide support services to a plurality of wireless communication devices, the services including
services to receive corresponding location information of the wireless communication devices,
services to determine, based at least in part upon the location information, data associated with various portions of an image, and
services to transmit correspondingly and mutually exclusively the data associated with the various portions of the image to the various wireless communication devices to facilitate a coordinated generation of a multi-part luminescent representation of the image by the wireless communication devices; and
a processor coupled to the storage medium to execute said instructions.

41. The communication server of claim 40, wherein the location information comprises seating location information of a venue.

42. A wireless communication device comprising:
at least one light emitting device;
a microprocessor; and
means to selectively activate and deactivate the at least one light emitting device to display a luminescent representation of a portion of an image, without display luminescent representations of other portions of the image, to contribute to a cooperative generation of a multi-part luminescent representations of the image with other wireless communication devices.

* * * * *

UNITED STATES PATENT AND TRADEMARK OFFICE
CERTIFICATE OF CORRECTION

PATENT NO. : 6,965,785 B2 Page 1 of 1
APPLICATION NO. : 09/975524
DATED : November 15, 2005
INVENTOR(S) : Gary N. Mager, Paul R. Nash and Eric Engstrom It is certified that error appears in the above-identified patent and that said Letters Patent is hereby corrected as shown below:

Column 3
Line 61, "...cooperation with addition wireless..." should read --...cooperation with additional wireless...--.

Column 4
Line 2, "...camera an subdivide..." should read --...camera and subdivide...--.

Column 6
Line 50, "...intensity or brightest..." should read --...intensity or brightness...--.

Column 18
Line 54, "...of claim 13..." should read --...of claim 29...--.

Signed and Sealed this

Twenty-second Day of May, 2007

JON W. DUDAS
*Director of the United States Patent and Trademark Office*